(12) United States Patent
Yonetani

(10) Patent No.: US 7,663,807 B2
(45) Date of Patent: Feb. 16, 2010

(54) MICROSCOPE OBJECTIVE

(75) Inventor: Atsushi Yonetani, Ina (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/999,644

(22) Filed: Dec. 5, 2007

(65) Prior Publication Data

US 2008/0180805 A1  Jul. 31, 2008

(30) Foreign Application Priority Data

Jan. 31, 2007 (JP) .............................. 2007-021643

(51) Int. Cl.
*G02B 21/02* (2006.01)
*G02B 21/00* (2006.01)

(52) U.S. Cl. ...................................... 359/661; 359/368
(58) Field of Classification Search ......... 359/656–661, 359/368, 379, 380
See application file for complete search history.

(56) References Cited

U.S. PATENT DOCUMENTS

| 4,588,264 | A * | 5/1986 | Shimizu ...................... 359/657 |
| 6,501,603 | B2 | 12/2002 | Kasahara |
| 6,822,805 | B2 * | 11/2004 | Kurata ........................ 359/656 |
| 7,262,922 | B2 * | 8/2007 | Yamaguchi ................. 359/656 |
| 2002/0027707 | A1 | 3/2002 | Ono |
| 2004/0105164 | A1 | 6/2004 | Miyashita |
| 2004/0201900 | A1 * | 10/2004 | Kurata ........................ 359/660 |
| 2007/0091454 | A1 | 4/2007 | Wartmann |
| 2008/0212199 | A1 * | 9/2008 | Yonetani ..................... 359/659 |

FOREIGN PATENT DOCUMENTS

| EP | 1 746 448 | 1/2007 |
| JP | 59 100409 | 6/1984 |
| JP | 3-58492 | 9/1991 |
| JP | 08 248321 | 9/1996 |
| JP | 09 089753 | 4/1997 |
| JP | 3371934 | 11/2002 |
| JP | 2005-189732 | 7/2005 |
| JP | 2007-41510 | 2/2007 |
| JP | 2007-133071 | 5/2007 |

* cited by examiner

*Primary Examiner*—William C Choi
(74) *Attorney, Agent, or Firm*—Kenyon & Kenyon LLP

(57) ABSTRACT

A microscope objective includes, in order from the object side, a first lens unit with positive refracting power, having two meniscus lenses, each with a concave surface facing the object side, and at least one positive lens; a second lens unit with positive refracting power; and a third lens unit having concave surfaces adjacent and opposite to each other configured as air contact surfaces. The microscope objective satisfies the following conditions:

$$7 \leq f$$

$$0.5 < NA$$

where f is the focal length (mm) of the microscope objective and NA is the numerical aperture of the microscope objective on the entrance side.

4 Claims, 5 Drawing Sheets

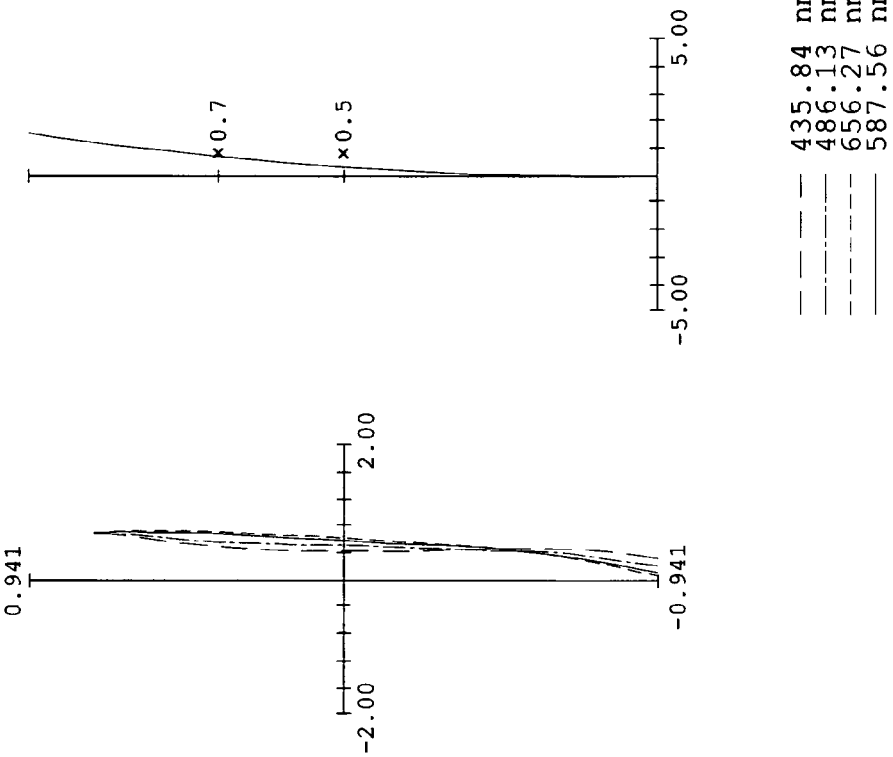
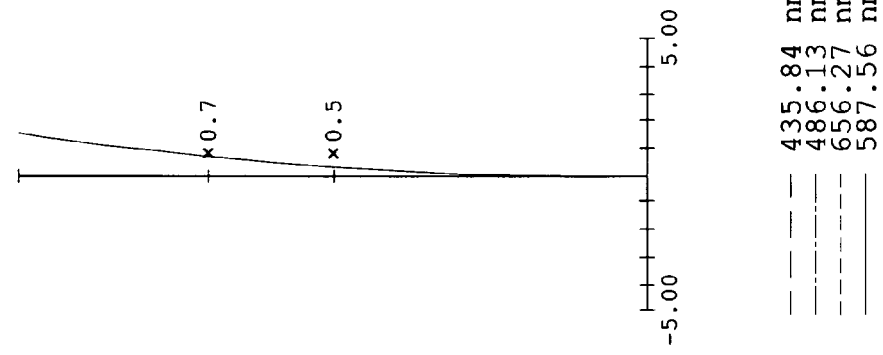
FIG.2A SPHERICAL ABERRATION NA:0.8
FIG.2B ASTIGMATISM IH:11.00
FIG.2C CHROMATIC ABERRATION OF MAGNIFICATION IH:11.00
FIG.2D DISTORTION IH:11.00
435.84 nm
486.13 nm
656.27 nm
587.56 nm

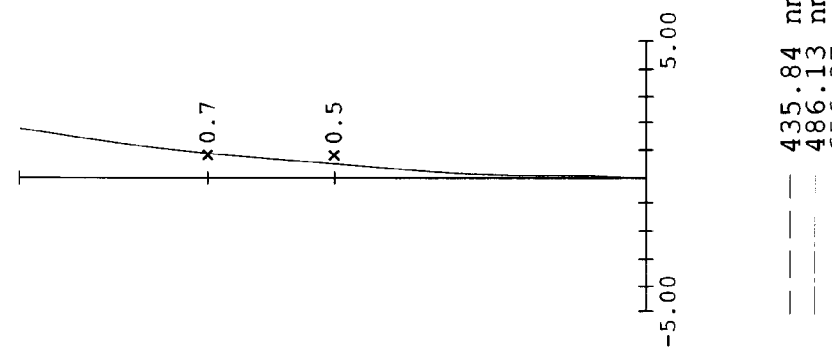
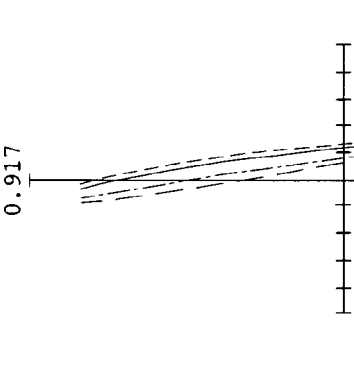
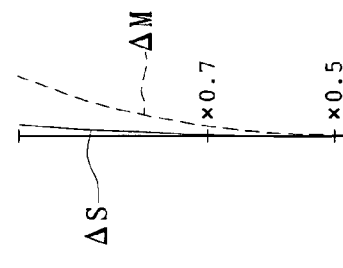

MICROSCOPE OBJECTIVE

This application claims benefits of Japanese Application No. 2007-021643 filed in Japan on Jan. 31, 2007, the contents of which are incorporated herein by reference.

BACKGROUND OF THE INVENTION

1. Field of the Invention

This invention relates to a microscope objective which is applicable to a microscope having high extensiveness that is capable of providing a high NA while having a wide observation range to acquire a feeble light signal at a high S/N ratio in microscopy, and to a microscope system provided with this microscope.

2. Description of Related Art

In the most advanced research field at present, various methods of observing cells, in vivo, for a long period of time (several days to several weeks) are developed for purposes of the functional clarification of living cells and the behavior analysis and interaction clarification of a protein. As one technique of microscopy for observing a lesion part inside a living cell, the method of making a fluorescence observation is largely used. The fluorescence observation is such that, after a particular fluorescent substance like a fluorescent protein is used as a light-emitting label to stain a living specimen like the living cell, fluorescent light is produced by irradiating the specimen with exciting light and is observed to thereby detect the existence and position of a particular part in the living specimen, such as the lesion part inside the living cell.

In general, an objective for biological microscopes is constructed so that an observation object (the specimen) is viewed through a cover glass and is designed so that, for example, aberration produced by the cover glass is corrected on the premise that the thickness of the cover glass has a constant reference value.

However, the cover glass is attended with a fabrication error. Depending on the observation technique, the observation object is sometimes viewed through a nearly plane-parallel plate of thickness different from that of the reference value, such as the cover glass or a Petri dish.

Thus, when the thickness of the cover glass is different from that of the reference value and is varied, aberration produced in accordance with variation of the thickness of the cover glass cannot be completely corrected by the objective and imaging performance is degraded. In particular, as the NA becomes high, the degradation of the imaging performance becomes pronounced.

However, conventional microscope objectives for correcting aberration produced in accordance with the variation of the thickness of the cover glass interposed between the surface of the observation object and the objective are set forth, for example, in Japanese Patent Publication No. Hei 03-58492 and Japanese Patent No. 3371934.

In the fluorescence observation, when some stimulus is given to the living specimen, for example, by the irradiation of exciting light, there is the possibility that the stimulus itself adversely affects an active state of the cell. Consequently, it is desired to provide a microscope system such that the light-emitting label is stimulated with the weakest possible stimulus (low-intensity exciting light) and a weak luminous signal produced in accordance with this stimulus can be detected at extremely high efficiency.

Simultaneously, it is also desired to provide a microscope system in which provisions are made for keeping a state of behavior of the living cell in sight and at the same time, detecting much information from the cell at a time through the observation in a wide range so that a processing speed and work efficiency can be improved.

In the field of conventional microscope apparatuses, however, microscope apparatuses fulfilling the above requirements and microscope systems provided with these microscope apparatuses have no existence. As such, the objectives set forth in the prior art references mentioned above are not constructed on the premise that they are applied to microscope apparatuses fulfilling the above requirements and microscope systems provided with these microscope apparatuses.

However, the applicant of the present invention, in Japanese Patent Publication No. 2007-41510 filed by this applicant, proposes the microscope fulfilling the above requirements, that is, the microscope having high extensiveness that is capable of providing a high NA while having a wide observation range to acquire a feeble light signal at a high S/N ratio and the microscope system provided with this microscope.

Even in such a microscope objective, it is desired to correct aberration produced in accordance with the variation of the thickness of the cover glass. In biochemical microscopy, the fluctuation of aberration may be caused not only by the variation of the thickness of the cover glass, but also by a difference with room temperature in the case where the microscope is used at the temperature of cell culture, and correction for the fluctuation of aberration is desired.

SUMMARY OF THE INVENTION

The microscope objective according to the present invention comprises, in order from the object side, a first lens unit with positive refracting power, having two meniscus lenses, each with a concave surface facing the object side, and at least one positive lens; a second lens unit with positive refracting power; and a third lens unit having lenses in which concave surfaces adjacent and opposite to each other are configured as air contact surfaces.

It the microscope objective according to the present invention, it is desirable to satisfy the following conditions:

$$7 \leq f \qquad (1)$$

$$0.5 < NA \qquad (2)$$

where f is the focal length (mm) of the microscope objective and NA is the numerical aperture of the microscope objective on the entrance side.

In the microscope objective according to the present invention, it is desirable that the second lens unit is movable along the optical axis so that the fluctuation of aberration produced in accordance with variation of the thickness of a nearly plane-parallel plate interposed between an observation object and the first lens unit can be corrected.

In the microscope objective according to the present invention, it is desirable that the second lens unit satisfies the following condition:

$$0.8 \leq |\beta 2| \leq 1.2 \qquad (3)$$

where $\beta 2$ is the lateral magnification of the second lens unit where the imaging point of the first lens unit is calculated as an object point.

In the microscope objective according to the present invention, it is desirable that a positive lens located on the image side of the two meniscus lenses of the first lens unit is movable along the optical axis so that the fluctuation of aberration produced in accordance with variations of ambient temperatures of the microscope objective and on the periphery of the microscope objective can be corrected.

In the microscope objective according to the present invention, it is desirable to satisfy the following condition:

$$60 < D \leq 120 \quad (4)$$

where D is a distance (mm), measured along the optical axis, from an object surface to a nosepiece mounting surface of the microscope objective where a direction from the object side toward the image side is assumed to be positive. Here, the object surface refers to a surface perpendicular to the optical axis of the microscope objective, including the observation object, and the nosepiece mounting surface of the microscope objective refers to an abutting surface where the microscope objective is mounted to a microscope body.

According to the present invention, it is possible to obtain the microscope objective which is applicable to a microscope apparatus having high extensiveness that is capable of providing a high NA while having a wide observation range to acquire a feeble light signal at a high S/N ratio and to a microscope system provided with this microscope and which has a wide field and a high NA while maintaining the interchangeability with the conventional microscope system and exhibits the performance of favorable correction for aberration.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are graphs showing spherical aberration, astigmatism, chromatic aberration of magnification, and distortion, respectively, of the microscope objective in Embodiment 1;

FIGS. 4A, 4B, 4C, and 4D are graphs showing spherical aberration, astigmatism, chromatic aberration of magnification, and distortion, respectively, of the microscope objective in Embodiment 2.

DETAILED DESCRIPTION OF THE PREFERRED EMBODIMENTS

Figure 1:
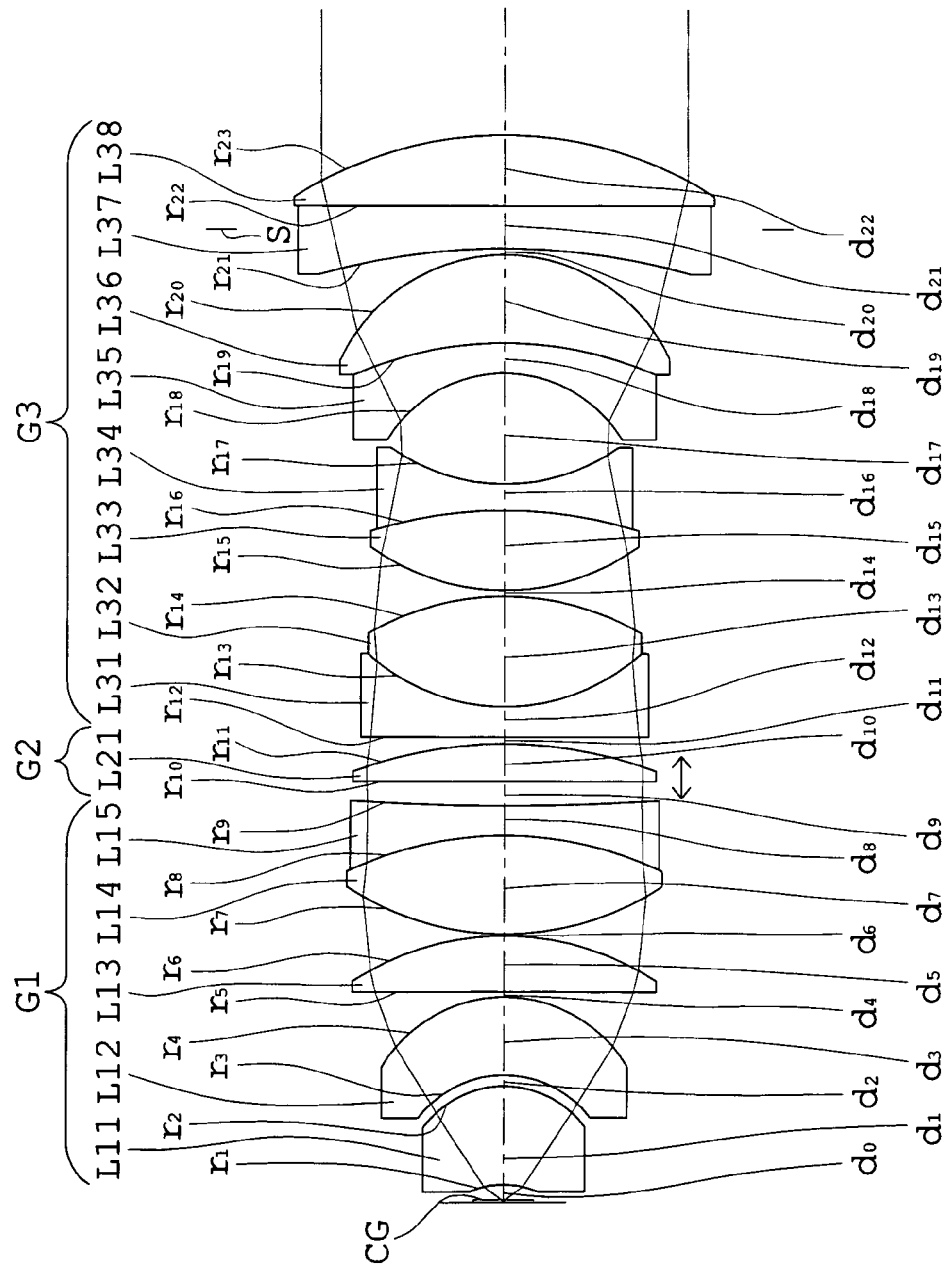
FIG. 1 is a sectional view showing a schematic arrangement, developed along the optical axis, of Embodiment 1 of the microscope objective according to the present invention.

Before undertaking the description of the embodiments, the function and effect of the present invention will be explained in detail.

The microscope objective according to the present invention comprises, in order from the object side, a first lens unit with positive refracting power, having two meniscus lenses, each with a concave surface facing the object side, and at least one positive lens; a second lens unit with positive refracting power; and a third lens unit having lenses in which concave surfaces adjacent and opposite to each other are configured as air contact surfaces.

This lens arrangement provides the objective suitable for the microscope apparatus and the microscope system of Patent Publication No. 2007-41510 mentioned above.

When the first lens unit is constructed so that the two meniscus lenses, each with a concave surface facing the object side, are arranged in turn, ray height can be progressively increased without oversupplying the refracting power.

When the second lens unit is constructed to have the positive refracting power, it is avoidable to make the ray height greater than is necessary, and thus the amount of production of aberration can be kept to a minimum.

When the third lens unit is constructed to have the lenses in which concave surfaces adjacent and opposite to each other are configured as air contact surfaces, the Petzval sum can be easily reduced.

Also, it is desirable that the air contact surfaces of the concave surfaces adjacent and opposite to each other are constructed by only one set, from the viewpoint of a reduction in the number of lenses and the simplification of the internal structure of the objective, as compared with the construction by a plurality of sets.

In the microscope objective according to the present invention, it is desirable to satisfy Conditions (1) and (2). When Conditions (1) and (2) are satisfied, it is possible to obtain the objective which is suitable for the microscope apparatus and the microscope system of Patent Publication No. 2007-41510 and which has a wide field, a low magnification, and a high NA while maintaining the interchangeability with the conventional microscope system.

In the microscope objective according to the present invention, it is desirable that the second lens unit is movable along the optical axis so that the fluctuation of aberration produced in accordance with variation of the thickness of a nearly plane-parallel plate interposed between an observation object and the first lens unit can be corrected.

This construction brings about the objective with a correction collar which has a wide field and a high NA, capable of correcting the fluctuation of aberration produced in accordance with variation of the thickness of the cover glass.

In the microscope objective according to the present invention, it is desirable that the second lens unit satisfies Condition (3). When Condition (3) is satisfied, it is possible to obtain the objective with a correction collar, having a wide field and a high NA, in which even when the thickness of the cover glass is varied, the shift of the position of an image point can be kept to a minimum, and in which convenience of the work of correction for aberration is improved.

In the second lens unit for correcting aberration, in order to keep the shift of the position of the image point to a minimum, it is necessary to minimize the refracting power of the second lens unit. For example, when the second lens unit is constructed of plane-parallel plate glass, the shift is not caused to the image point even when the second lens unit is moved. This is based on conditions that the refracting power of the plane-parallel plate glass is zero and the magnification is 1 with respect to an object at an infinite object distance. These conditions also mean that an image magnification is always 1 with respect to an object at an arbitrary object distance. When the second lens unit for correcting aberration with respect to a paraxial ray is equivalent to the plane-parallel plate glass, the image point requires a smaller shift. Thus, in order to keep the shift of the image point to a minimum, it is necessary that the second lens unit has the lowest possible refracting power and at the same time, the magnification is nearly 1.

When the second lens unit fails to satisfy Condition (3), the shift of the image point is increased and the work of correction for aberration becomes difficult.

In the microscope objective according to the present invention, it is desirable that a positive lens located on the image side of the two meniscus lenses of the first lens unit is movable along the optical axis so that the fluctuation of aberration produced in accordance with variations of ambient temperatures of the microscope objective and on the periphery of the microscope objective can be corrected.

This construction brings about the microscope objective with a temperature correction collar which has a wide field and a high NA, capable of correcting the fluctuation of aberration which may be produced by a difference with room temperature in the case where the microscope is used at the temperature of cell culture, in addition to the variation of the thickness of the cover glass.

In the microscope objective according to the present invention, it is desirable to satisfy Condition (4). If the distance D is below the lower limit of Condition (4), space for using a sufficient number of lenses required to make correction for aberration described above will cease to be ensured. On the other hand, beyond the upper limit of Condition (4), the entire objective is bulky and the compact design of the entire microscope system becomes difficult.

Embodiment 1

In accordance with the drawings, the embodiments of the present invention will be explained below.

FIG. 1 shows a schematic arrangement, developed along the optical axis, of Embodiment 1 of the microscope objective according to the present invention. FIGS. 2A, 2B, 2C, and 2D are graphs showing spherical aberration, astigmatism, chromatic aberration of magnification, and distortion, respectively, of the microscope objective in Embodiment 1.

The microscope objective of Embodiment 1 comprises, in order from the object side, a first lens unit G1, a second lens unit G2, and a third lens unit G3. Also, in FIG. 1, reference symbol CG represents a cover glass.

The first lens unit G1 includes, in order from the object side, a first positive meniscus lens L11 with a concave surface facing the object side, a second single meniscus lens L12 with a concave surface facing the object side, a plano-convex lens L13 whose object-side surface is flat and whose image-side surface is convex, and a cemented doublet of a biconvex lens L14 and a biconcave lens L15, and has positive refracting power as a whole.

The second lens unit G2 is constructed with a plano-convex lens L21 whose object-side surface is flat and whose image-side surface is convex.

Also, the second lens unit G2 is constructed to be movable along the optical axis so that the fluctuation of aberration produced in accordance with a change of the thickness of a nearly plane-parallel plate, such as a cover glass or a Petri dish, interposed between an observation object and the first lens unit G1 can be corrected.

The third lens unit G3 includes, in order from the object side, a cemented doublet of a plano-concave lens L31 whose object-side surface is flat and whose image-side surface is concave and a biconvex lens L32, a cemented doublet of a biconvex lens L33 and a biconcave lens L34, a cemented doublet of a negative meniscus lens L35 with a concave surface facing the object side and a positive meniscus lens L36 with a concave surface facing the object side, and a cemented doublet of a plano-concave lens L37 whose object-side surface is concave and whose image-side surface is flat and a plano-convex lens L38 whose object-side surface is flat and whose image-side surface is convex.

The biconcave lens L34 and the negative meniscus lens L35 are such that a set of concave surfaces adjacent and opposite to each other are configured as air contact surfaces.

Subsequently, numerical data of optical members constituting the microscope objective of Embodiment 1 are shown below. In the numerical data, $r_1, r_2, \ldots$ denote radii of curvature of surfaces of the optical members; $d_1, d_2, \ldots$ denote face-to-face distances of the optical members (thicknesses or air spacings between them); $n_{d1}, n_{d2}, \ldots$ denote refractive indices of the optical members at the d line; $v_{d1}, v_{d2}, \ldots$ denote Abbe's numbers of the optical members at the d line; f denotes the focal length of the objective; NA denotes the numerical aperture of the objective on the entrance side; β2 denotes the lateral magnification of the second lens unit G2 where the imaging point of the first lens unit G1 is calculated as the object point; $d_0$ denotes a distance, measured along the optical axis, from the upper surface of the cover glass to the first surface of the objective; and D denotes a distance (mm), measured along the optical axis, from an object surface to a nosepiece mounting surface S of the objective where a direction from the object side toward the image side is assumed to be positive. These symbols are also used for the numerical data of another embodiment to be described later.

Numerical data 1 (Embodiment 1)

Thickness of cover glass: 0.17 mm
f = 18 mm
NA = 0.8
β2 = −1.11

| | | | |
|---|---|---|---|
| $r_1 = -7.3878$ | $d_1 = 7.7502$ | $n_{d1} = 1.7865$ | $v_{d1} = 50$ |
| $r_2 = -8.0452$ | $d_2 = 0.7875$ | | |
| $r_3 = -8.8338$ | $d_3 = 6.1369$ | $n_{d3} = 1.603$ | $v_{d3} = 65.44$ |
| $r_4 = -11.3001$ | $d_4 = 0.4246$ | | |
| $r_5 = \infty$ | $d_5 = 4.4184$ | $n_{d5} = 1.497$ | $v_{d5} = 81.54$ |
| $r_6 = -21.451$ | $d_6 = 0.1139$ | | |
| $r_7 = 21.7103$ | $d_7 = 7.8237$ | $n_{d7} = 1.43875$ | $v_{d7} = 94.93$ |
| $r_8 = -28.7977$ | $d_8 = 2.4$ | $n_{d8} = 1.7725$ | $v_{d8} = 49.6$ |
| $r_9 = 192.794$ | $d_9 = 1.9779$ | | |
| $r_{10} = \infty$ | $d_{10} = 2.9889$ | $n_{d10} = 1.43875$ | $v_{d10} = 94.93$ |
| $r_{11} = -32.0412$ | $d_{11} = 0.4775$ | | |
| $r_{12} = \infty$ | $d_{12} = 2.3$ | $n_{d12} = 1.7725$ | $v_{d12} = 49.6$ |
| $r_{13} = 15.6187$ | $d_{13} = 8.8294$ | $n_{d13} = 1.43875$ | $v_{d13} = 94.93$ |
| $r_{14} = -21.5268$ | $d_{14} = 0.4918$ | | |
| $r_{15} = 17.755$ | $d_{15} = 6.337$ | $n_{d15} = 1.43875$ | $v_{d15} = 94.93$ |
| $r_{16} = -35.4936$ | $d_{16} = 2.1$ | $n_{d16} = 1.6134$ | $v_{d16} = 44.27$ |
| $r_{17} = 15.8401$ | $d_{17} = 8.7105$ | | |
| $r_{18} = -10.6688$ | $d_{18} = 2.4$ | $n_{d18} = 1.788$ | $v_{d18} = 47.37$ |
| $r_{19} = -28.6362$ | $d_{19} = 6.8611$ | $n_{d19} = 1.43875$ | $v_{d19} = 94.93$ |
| $r_{20} = -14.2704$ | $d_{20} = 0.5298$ | | |
| $r_{21} = -52.7292$ | $d_{21} = 3.3$ | $n_{d21} = 1.51633$ | $v_{d21} = 64.14$ |
| $r_{22} = \infty$ | $d_{22} = 5.5916$ | $n_{d22} = 1.673$ | $v_{d22} = 38.15$ |
| $r_{23} = -30.4292$ | | | |

Axial distance from surface $r_{23}$ to nosepiece mounting surface S: −10 mm

| Cover glass thickness | $d_0$ | $d_9$ | $d_{11}$ | D |
|---|---|---|---|---|
| 0.1204 mm | 1.2804 | 2.1412 | 0.3143 | 74.1516 |
| 0.17 mm | 1.248 | 1.9779 | 0.4775 | 74.1687 |
| 0.249 mm | 1.1965 | 1.7039 | 0.7516 | 74.1963 |

Embodiment 2

Figure 3:
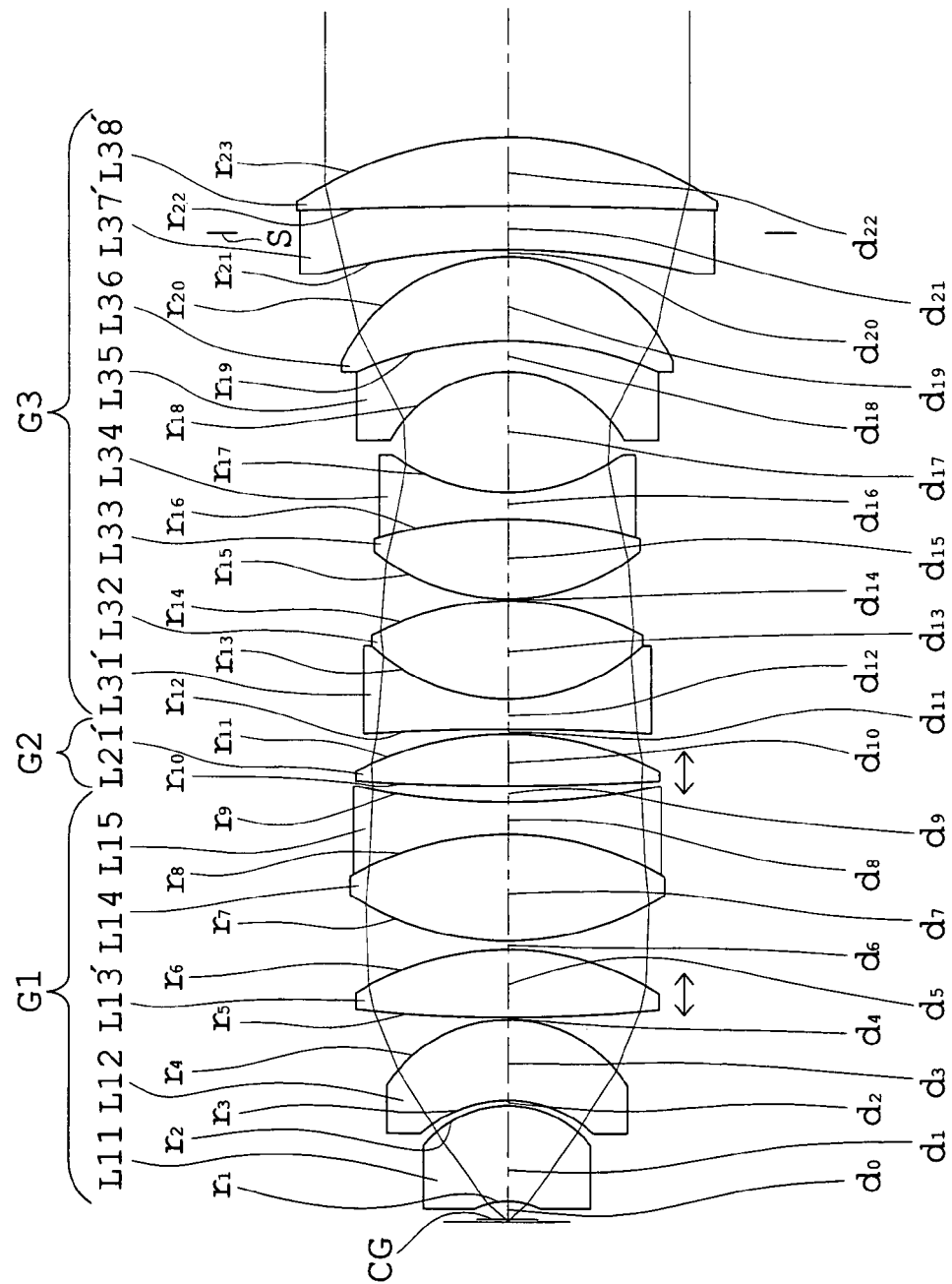
FIG. 3 is a sectional view showing a schematic arrangement, developed along the optical axis, of Embodiment 2 of the microscope objective according to the present invention.

FIG. 3 shows a schematic arrangement of Embodiment 2 of the microscope objective according to the present invention. FIGS. 4A, 4B, 4C, and 4D are graphs showing spherical aberration, astigmatism, chromatic aberration of magnification, and distortion, respectively, of the microscope objective in Embodiment 2.

The microscope objective of Embodiment 2 comprises, in order from the object side, the first lens unit G1, the second lens unit G2, and the third lens unit G3. In FIG. 3, again, reference symbol CG represents the cover glass.

The first lens unit G1 includes, in order from the object side, the first positive meniscus lens L11 with a concave surface facing the object side, the second single meniscus lens L12 with a concave surface facing the object side, a biconvex lens L13', and the cemented doublet of the biconvex lens L14 and the biconcave lens L15, and has positive refracting power as a whole.

The biconvex lens L13' is constructed to be movable along the optical axis so that the fluctuation of aberration produced in accordance with variations of ambient temperatures of the microscope objective of Embodiment 2 and on the periphery of this microscope objective can be corrected.

The second lens unit G2 is constructed with a biconvex lens L21'.

Also, the second lens unit G2 is constructed to be movable along the optical axis so that the fluctuation of aberration produced in accordance with variation of the thickness of a nearly plane-parallel plate, such as a cover glass or a Petri dish, interposed between the observation object and the first lens unit G1 can be corrected.

The third lens unit G3 includes, in order from the object side, a cemented doublet of a biconcave lens L31' and the biconvex lens L32, the cemented doublet of the biconvex lens L33 and the biconcave lens L34, the cemented doublet of the negative meniscus lens L35 with a concave surface facing the object side and the positive meniscus lens L36 with a concave surface facing the object side, and a cemented doublet of a negative meniscus lens L37' with a concave surface facing the object side and a positive meniscus lens L38' with a concave surface facing the object side.

The biconcave lens L34 and the negative meniscus lens L35 are such that a set of concave surfaces adjacent and opposite to each other are configured as air contact surfaces.

Subsequently, numerical data of optical members constituting the microscope objective of Embodiment 2 are shown below.

Numerical data 2 (Embodiment 2)

Thickness of cover glass: 0.1757 mm (at room temperature)
$f = 17.95$ mm
$NA = 0.8$
$\beta 2 = -1.07$

| | | | |
|---|---|---|---|
| $r_1 = -6.2893$ | $d_1 = 7.435$ | $n_{d1} = 1.788$ | $v_{d1} = 47.37$ |
| $r_2 = -8.4983$ | $d_2 = 0.435$ | | |
| $r_3 = -10.1532$ | $d_3 = 6.314$ | $n_{d3} = 1.603$ | $v_{d3} = 65.44$ |
| $r_4 = -11.3001$ | $d_4 = 0.1634$ | | |
| $r_5 = 123.3491$ | $d_5 = 5.3088$ | $n_{d5} = 1.497$ | $v_{d5} = 81.54$ |
| $r_6 = -22.1261$ | $d_6 = 0.6147$ | | |
| $r_7 = 22.8619$ | $d_7 = 8.5103$ | $n_{d7} = 1.497$ | $v_{d7} = 81.54$ |
| $r_8 = -23.4122$ | $d_8 = 2.5$ | $n_{d8} = 1.7725$ | $v_{d8} = 49.6$ |
| $r_9 = 58.226$ | $d_9 = 1.2807$ | | |
| $r_{10} = 177.3687$ | $d_{10} = 4.016$ | $n_{d10} = 1.497$ | $v_{d10} = 81.54$ |
| $r_{11} = -26.1937$ | $d_{11} = 0.4724$ | | |
| $r_{12} = -154.047$ | $d_{12} = 2.4$ | $n_{d12} = 1.7725$ | $v_{d12} = 49.6$ |
| $r_{13} = 15.83$ | $d_{13} = 7.7124$ | $n_{d13} = 1.43875$ | $v_{d13} = 94.93$ |
| $r_{14} = -22.5419$ | $d_{14} = 0.1279$ | | |
| $r_{15} = 16.67$ | $d_{15} = 6.3026$ | $n_{d15} = 1.43875$ | $v_{d15} = 94.93$ |
| $r_{16} = -35.2899$ | $d_{16} = 2.1$ | $n_{d16} = 1.6134$ | $v_{d16} = 44.27$ |
| $r_{17} = 15.1661$ | $d_{17} = 9.4155$ | | |
| $r_{18} = -10.7118$ | $d_{18} = 2.503$ | $n_{d18} = 1.788$ | $v_{d18} = 47.37$ |
| $r_{19} = -28.9605$ | $d_{19} = 6.5584$ | $n_{d19} = 1.43875$ | $v_{d19} = 94.93$ |
| $r_{20} = -14.3451$ | $d_{20} = 0.5248$ | | |
| $r_{21} = -57.7601$ | $d_{21} = 3.3962$ | $n_{d21} = 1.51633$ | $v_{d21} = 64.14$ |
| $r_{22} = -486.9661$ | $d_{22} = 5.4523$ | $n_{d22} = 1.673$ | $v_{d22} = 38.15$ |
| $r_{23} = -29.6884$ | | | |

Axial distance from surface $r_{23}$ to nosepiece mounting surface S: $-10$ mm

| Ambient temperature | Cover glass thickness | $d_0$ | $d_4$ | $d_6$ | $d_9$ | $d_{11}$ | D |
|---|---|---|---|---|---|---|---|
| Room temperature | 0.1235 mm | 1.3975 | 0.1634 | 0.6147 | 1.408 | 0.345 | 75.0643 |
| Room temperature | 0.1757 mm | 1.3634 | 0.1634 | 0.6147 | 1.2807 | 0.4724 | 75.0825 |
| Room temperature | 0.254 mm | 1.3124 | 0.1634 | 0.6147 | 1.0746 | 0.6784 | 75.1097 |
| 37° C. | 0.1197 mm | 1.3883 | 0.672 | 0.12 | 1.408 | 0.345 | 75.0652 |
| 37° C. | 0.17 mm | 1.3552 | 0.672 | 0.12 | 1.2807 | 0.4724 | 75.0825 |
| 37° C. | 0.2497 mm | 1.3029 | 0.672 | 0.12 | 1.0746 | 0.6784 | 75.1098 |

Figure 5:
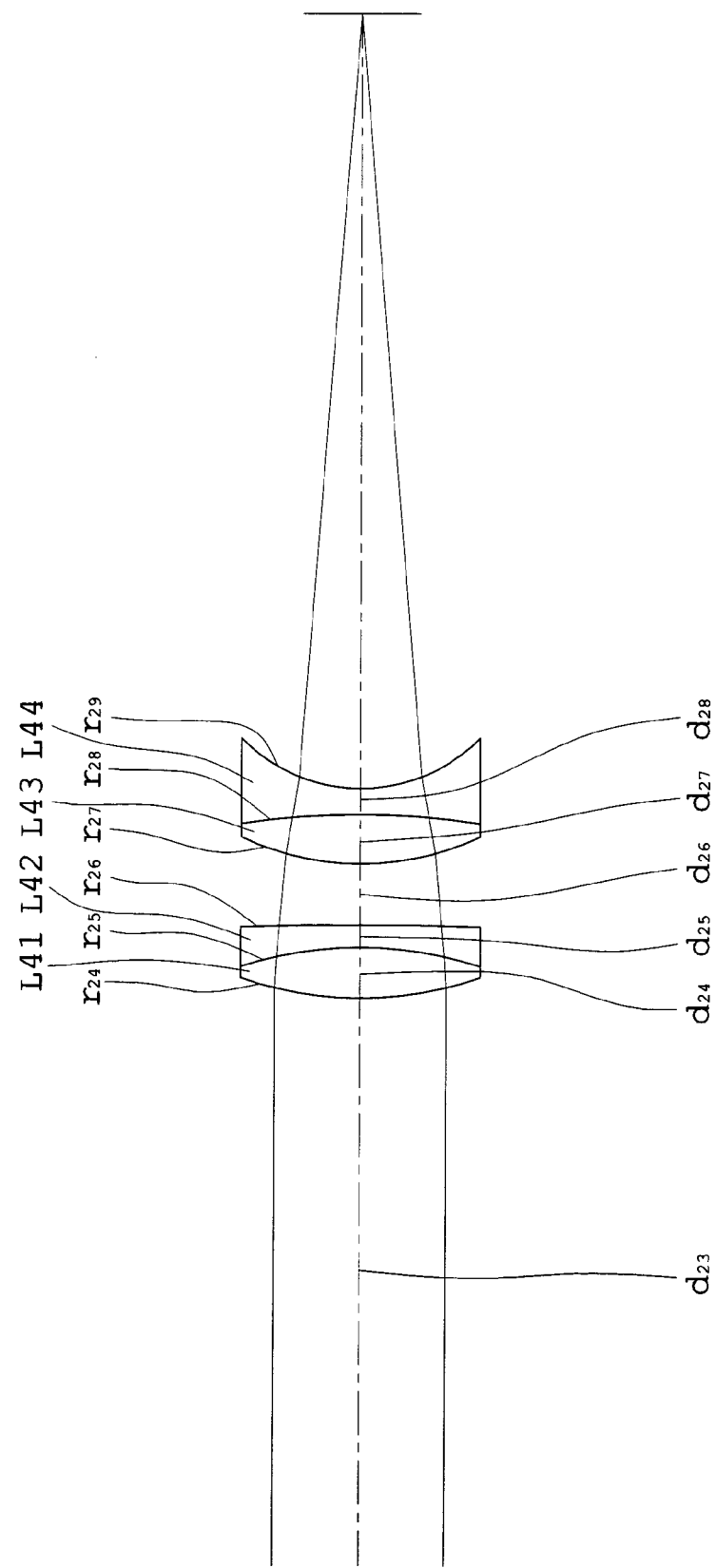
FIG. 5 is a sectional view showing a schematic arrangement, developed along the optical axis, of an imaging lens (a tube lens unit) combined with the microscope objective of each of the embodiments mentioned above.

FIG. 5 shows a schematic arrangement of an imaging lens (a tube lens unit) combined with the microscope objective of each of the embodiments mentioned above. Also, this imaging lens is used in the microscope objective of each of the above embodiments.

The imaging lens combined with the microscope objective of each of the embodiments comprises, in order from the object side, a cemented doublet of a biconvex lens L41 and a negative meniscus lens L42 with a concave surface facing the object side and a cemented doublet of a biconvex lens L43 and a biconcave lens L44.

Subsequently, numerical data of optical members constituting the imaging lens combined with the microscope objective of each of the embodiments are shown below. In the numerical data, ftl denotes the focal length of the entire imaging lens, and $d_{23}$ denotes an axial distance from the rearmost surface of the objective to the first surface of the imaging lens. Also, radii of curvature $r_n, r_{n+1}, \ldots$ of surfaces of the optical members; face-to-face distances (thicknesses or air spacings between them) $d_n, d_{n+1}, \ldots$ of the optical members; refractive indices $n_{dn}, n_{dn+1}, \ldots$ of the optical members at the d line; and Abbe's numbers $v_{dn}, v_{dn+1}, \ldots$ of the optical members at the d line are indicated by numbers subsequent to surface numbers of the objective.

Numerical data 3 (Imaging lens data used in each of Embodiments 1 and 2)

ftl: 180 mm

| | | | |
|---|---|---|---|
| $r_{24}$ = 60.4357 | $d_{24}$ = 8.5 | $n_{d24}$ = 1.497 | $v_{d24}$ = 81.54 |
| $r_{25}$ = −67.2328 | $d_{25}$ = 3.8 | $n_{d25}$ = 1.72047 | $v_{d25}$ = 34.71 |
| $r_{26}$ = −640.476 | $d_{26}$ = 10.2859 | | |
| $r_{27}$ = 44.0586 | $d_{27}$ = 8.5 | $n_{d27}$ = 1.72342 | $v_{d27}$ = 37.95 |
| $r_{28}$ = −113.8863 | $d_{28}$ = 4.4 | $n_{d28}$ = 1.6134 | $v_{d28}$ = 44.27 |
| $r_{29}$ = 28.0371 | | | |

Axial distance $d_{23}$ (mm) from the rearmost surface of the objective to the first surface of the imaging lens

| | At room temperature | At 37° C. |
|---|---|---|
| Embodiment 1 | 80.8294 | 80.1551 |
| Embodiment 2 | 79.9517 | 79.9517 |

The microscope objective of the present invention is useful in the fields of medicine and biology in which it is desired that feeble light is observed by various observation techniques over a wide observation range.

What is claimed is:

1. A microscope dry objective comprising, in order from an object side:
   a first lens unit with positive refracting power, having two meniscus lenses, each with a concave surface facing the object side, and at least one positive lens;
   a second lens unit with positive refracting power; and
   a third lens unit having concave surfaces adjacent and opposite to each other configured as air contact surfaces,
   wherein the following conditions are satisfied:

$7 \leq f$ $0.5 < NA$ where f is a focal length, in millimeters, of the microscope dry objective and NA is a numerical aperture of the microscope dry objective on an entrance side, and
   wherein the second lens unit is movable along an optical axis so that a fluctuation of aberration produced in accordance with variation of a thickness of a nearly plane-parallel plate interposed between an observation object and the first lens unit is corrected.

2. A microscope dry objective comprising, in order from an object side:
   a first lens unit with positive refracting power, having two meniscus lenses, each with a concave surface facing the object side, and at least one positive lens;
   a second lens unit with positive refracting power; and
   a third lens unit having concave surfaces adjacent and opposite to each other configured as air contact surfaces,
   wherein the following conditions are satisfied:

$7 \leq f$ $0.5 < NA$ where f is a focal length, in millimeters, of the microscope dry objective and NA is a numerical aperture of the microscope dry objective on an entrance side, and
   wherein the second lens unit satisfies the following condition:

$0.8 \leq |\beta 2| \leq 1.2$ where β2 is a lateral magnification of the second lens unit where an imaging point of the first lens unit is calculated as an object point.

3. A microscope dry objective comprising, in order from an object side:
   a first lens unit with positive refracting power, having two meniscus lenses, each with a concave surface facing the object side, and at least one positive lens;
   a second lens unit with positive refracting power; and
   a third lens unit having concave surfaces adjacent and opposite to each other configured as air contact surfaces,
   wherein the following conditions are satisfied:

$7 \leq f$ $0.5 < NA$ where f is a focal length, in millimeters, of the microscope dry objective and NA is a numerical aperture of the microscope dry objective on an entrance side, and
   wherein a positive lens located on an image side of the two meniscus lenses of the first lens unit is movable along an optical axis so that a fluctuation of aberration produced in accordance with variations of ambient temperatures of the microscope dry objective and on a periphery of the microscope dry objective is corrected.

4. A microscope dry objective comprising, in order from an object side:
   a first lens unit with positive refracting power, having two meniscus lenses, each with a concave surface facing the object side, and at least one positive lens;
   a second lens unit with positive refracting power; and
   a third lens unit having concave surfaces adjacent and opposite to each other configured as air contact surfaces,
   wherein the following conditions are satisfied:

$7 \leq f$ $0.5 < NA$ $60 < D \leq 120$ where f is a focal length, in millimeters, of the microscope dry objective and NA is a numerical aperture of the microscope dry objective on an entrance side, and where D is a distance in millimeters, measured along an optical axis, from an object surface to a nosepiece mounting surface of the microscope dry objective where a direction from the object side toward an image side is defined to be positive, the object surface refers to a surface in which an observation object lies and which is perpendicular to the optical axis of the microscope dry objective, and the nosepiece mounting surface of the microscope dry objective refers to an abutting surface where the microscope dry objective is mounted to a microscope body.

* * * * *